United States Patent [19]

Josemans

[11] 4,035,597
[45] July 12, 1977

[54] SNAP-IN MEANS FOR MOUNTING ELECTRICAL DEVICES OR THE LIKE IN A SUPPORT PANEL APERTURE

[75] Inventor: Leonardus J. Josemans, Smithfield, Wis.

[73] Assignee: Cutler-Hammer, Inc., Milwaukee, Wis.

[21] Appl. No.: 635,689

[22] Filed: Nov. 26, 1975

[51] Int. Cl.² .................................. H01H 19/04
[52] U.S. Cl. .......................... 200/296; 200/153 G; 248/273
[58] Field of Search .......... 339/128; 200/295, 296, 200/153 G, 335, 339; 174/153 G; 248/27.1, 27.3

[56] References Cited

U.S. PATENT DOCUMENTS

| 2,936,437 | 5/1960 | Fraser | 339/128 |
| 3,065,035 | 11/1962 | Biesecker | 339/128 |
| 3,239,640 | 3/1966 | Turnbull | 200/295 |
| 3,971,908 | 7/1976 | Piber | 200/296 |

FOREIGN PATENT DOCUMENTS

| 1,194,306 | 11/1959 | France | 200/296 |
| 1,097,024 | 12/1967 | United Kingdom | 200/296 |

*Primary Examiner*—Gerald P. Tolin
*Attorney, Agent, or Firm*—Michael, Best & Friedrich

[57] ABSTRACT

The snap-in means includes a snap-in member carried in a recess provided in the outer end portion of a bushing which extends from a switch frame mounted on a switch base of an electrical toggle switch asembly and pivotally supports a toggle lever for actuating switch contacts housed in the switch base. The snap-in member, which is preferably molded from a synthetic plastic material, is adapted for mounting the switch assembly in a support panel mounting hole and includes a radially compressible locking flange having a lower or inner edge which engages the front side of the panel upon insertion of the outer end portion of the bushing through the panel mounting hole. The snap-in member also includes a radially extending, generally annular ridge having a bearing surface which is engageable with the backside rim of the panel mounting hole and cooperates with the locking flange to securely hold the switch assembly on the support panel.

In a preferred embodiment, the snap-in member is formed as a one-piece unit which is fitted into the bushing recess and includes a pair of opposed legs which snuggly hug the bushing to retain the snap-in member on the bushing.

10 Claims, 6 Drawing Figures

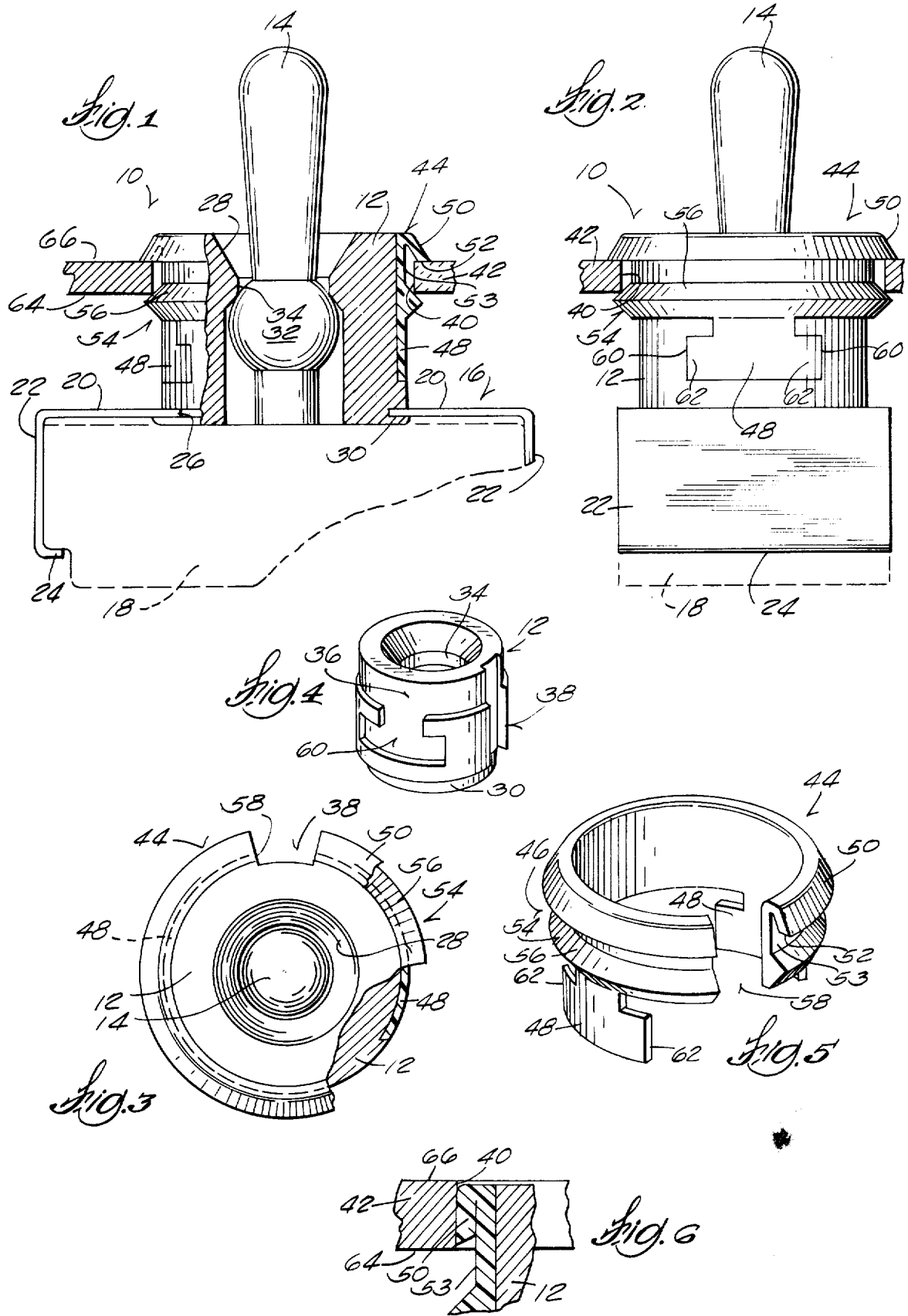

SNAP-IN MEANS FOR MOUNTING ELECTRICAL DEVICES OR THE LIKE IN A SUPPORT PANEL APERTURE

BACKGROUND OF THE INVENTION

This invention relates to push-in or snap-in mounting means for mounting a device in the hole of a mounting panel and, more particularly, to such mounting means adapted for use with electrical devices, such as a toggle switch or the like.

Push-in or snap-in mounting means for mounting devices, such as toggle switches or other electrical components, in a hole provided in a bulkhead or support panel are known. Prior art snap-in mounting constructions, particularly for rectangular mounting holes, typically have used biased fingers or the like which grip the edge of the mounting hole when a device is pressed into the hole. Many prior art panel mounting means have relatively complex constructions or require special tools for mounting and are not always completely satisfactory for the snap-in mounting of the circular bushings of a toggle switch because the mounting hole is completely closed and/or the mount does not provide a smooth and neat appearance at the front of the panel.

SUMMARY OF THE INVENTION

An objective of the invention is to provide a snap-in mounting means which is particularly adaptable for electrical switches or the like and is arranged to facilitate simple and quick installation into a mounting hole of a support panel without special tools.

Another object of the invention is to provide a snap-in mounting means for mounting a device, such as an electrical switch or the like, which can be inserted through a round mounting hole of a support panel from the back of the panel and presents a smooth and neat appearance at the front of the panel.

Other objects, aspects and advantages of the invention will become apparent upon reviewing the following detailed description, the drawing and the appended claims.

A snap-in mounting means provided by the invention includes a bushing having an outer end portion to be received in a hole of a support panel in which the device to be mounted, a resilient, radially compressible locking flange which is located on the outer end of the bushing, which terminates at a lower or inner edge and which flares radially outwardly towards the inner edge and a radially extending annular ridge having a bearing surface which is axially spaced from the inner edge of the locking flange at a distance approximating the thickness of the support panel and is adapted to engage the rim of the panel mounting hole. The locking flange is compressed radially inwardly during insertion of the bushing through the panel mounting hole and thereafter expands back to its normally flared position where the inner edge engages the front side of the panel and cooperates with the ridge bearing surface engaging the backside rim of the panel mounting hole to hold the device on the panel.

In a preferred embodiment, the locking flange and ridge are formed as integral parts of a one-piece snap-in member which is received in a recess provided in the outer end portion of the bushing. The snap-in member can be in the form of a ring-like member including the locking flange and the ridge and can further include a pair of opposed legs which depend on the ring-like portion and snuggly hug the bushing to assist in retaining the snap-in member on the bushing. The snap-in member of this embodiment preferably is molded from a synthetic plastic material and is arranged to be installed on the bushing by simply slipping over the outer end of the bushing and fitting into the bushing recess. The legs can be provided with lateral extensions which fit into portions of the bushing recess having a corresponding shape to retain the snap-in member against axial movement relative to the bushing.

BRIEF DESCRIPTION OF THE DRAWINGS

FIG. 1 is a fragmentary and partially sectioned, side elevation view of a one-hole, snap-in toggle switch assembly embodying various of the features of the invention and shown mounted on the bulkhead or support panel.

FIG. 2 is an end elevation view of the toggle switch assembly shown in FIG. 1.

FIG. 3 is a partial top view of the toggle switch assembly shown in FIG. 1.

FIG. 4 is a reduced perspective view of the bushing of the toggle switch assembly shown in FIG. 1.

FIG. 5 is a perspective view of the single piece, snap-in member carried by the bushing of the toggle switch assembly shown in FIG. 1.

FIG. 6 is an enlarged fragmentary cross sectional view of the panel, snap-in member and the bushing of FIG. 1 showing the position of the snap-in member locking flange during initial insertion of the bushing through the panel mounting hole.

DESCRIPTION OF THE PREFERRED EMBODIMENTS

Illustrated in the drawing a toggle switch assembly 10 embodying various of the features of the invention. The toggle switch assembly 10 includes an elongated bushing 12 having a generally circular cross section, a switch frame 16 and an insulating switch base 18 (illustrated schematically and fragmentarily by dashed lines in FIGS. 1 and 2) which houses electrical contacts (not shown). The toggle lever 14 and the switch base 18 are of conventional design so a detailed illustration and description of the structural features thereof is necessary for a full understanding of the invention. For example, the Miller U.S. Pat. No. 3,146,330, issued Aug. 25, 1964, disclosed a toggle switch assembly including a toggle lever and switch base arrangement adaptable for use in the invention.

The switch frame 16 has a generally retangular top 20 and a pair of depending legs 22 (one shown) one at each end. Located on the lower end of each leg 22 is one or more tabs 24, which upon assembly of the switch frame 16 and the switch base 18, are bent over into engagement with the switch base to secure the switch frame on the switch base with the top 20 covering the open top of the switch base.

The bushing 12 is mounted on and extends outwardly from the switch frame 16 coaxially with a circular aperture 26 provided in the switch frame (FIG. 1). The bushing 12 has a central bore 28 for receiving the toggle level 14. Located on the lower or inner end of the bushing 12 is a relatively thin, annular extension 30 which upon assembly of the bushing on the switch frame, is ultra-sonic welded into engagement with the underside of the switch frame to securely fasten the bushing to the switch frame, or the bushing can be molded integrally with the switch frame.

The toggle lever 14 has an external handle and extends through the bushing 12 with lower or inner end extending into the switch base 18 for actuation of the switch contacts, for example, as disclosed in the above-identified Miller patent. The toggle lever 14 also includes an enlarged spherical portion 32 which bears against a constricted portion 34 of the bushing bore 28 to afford pivotal movement of the toggle lever relative to the bushing during actuating movement.

As best shown in FIG. 4, the outer surface of the bushing 12 is generally cylindrical except for a recess 36 provided in the upper end portion for receiving a snap-in member to be described below and an axially extending keyway 38. The keyway 38 registers with a lug or key (not shown) normally provided in a circular mounting hole 40 of a bulk head or support panel 42 on which the switch assembly 10 is mounted (FIG. 1) to prevent the switch assembly from turning after it has been mounted.

Carried in the bushing recess 36 for holding the switch assembly 10 on the support panel 42 and covering the panel mounting hole 40 after mounting is a snap-in member 44 including a ring-like portion 46 and a pair of opposed legs 48 depending from the lower or inner end of the ring-like portion 46 (FIG. 5). Located on the upper and outer end of the ring-like portion 46 is a relatively thin locking flange 50 which flares radially outwardly from the upper or outer end of the ring-like portion 46 towards a terminating lower or inner edge 52. The outer dimension of the upper or outer portion of the locking flange 50 is smaller than the inside dimension of the panel mounting hole 50 and the outer dimension of the lower or outer portion is somewhat larger than the inside diameter of the hole. The locking flange is constructed from a resilient material and a radially compressible and expandable with respect to the main bocy 53 of the ring-like portion 46. Sufficient clearance is provided between the body 53 and the locking flange 50 to permit the locking flange to be squeezed through the panel mounting hole 40 during mounting of the switch assembly 10 as explained below.

Located on the ring-like portion 46 of the snap-in member 44 is a radially extending, generally annular ridge 54 having a bearing surface 56 which is engageable with the backside rim of the panel mounting hole 40 when the switch assembly 10 is mounted in the panel as shown in FIGS. 1 and 2. In order to accommodate manufacturing tolerance for the inside dimension of the panel mounting hole 40 and varying panel thicknesses, the bearing surface 56 preferably is tapered in cross section downwardly towards the switch base 16. As shown in FIGS. 3 and 5, the ring-like portion 46 includes a slot 58 which is aligned with the keyway 38 in the bushing 12.

To securely retain the snap-in ring member on the bushing 12, the legs 48 preferably are arranged to fit rather snugly against the side walls and to snugly hug the bottom walls of the leg-receiving portions 60 of the bushing recess (FIG. 4). That is, the legs 48 can be made slightly larger than the leg-receiving portions 60 of the bushing recess so as to provide a snap-in press fit and/or converge slightly towards each other so that they are inherently biased into hugging engagement with the bushing recess 36. Further, the legs 48 preferably are provided with lateral extensions 62 which fit into portions of the leg-receiving portions 60 of the bushing recess 36 having a corresponding shape to retain the snap-in member 44 against axial movement relative to the bushing 12. In the specific construction illustrated, the legs have an inverted T-shape and are curved to conform with contour of the bushing.

In order to minimize fabrication and assembly costs, the snap-in member 44 preferably is formed as a one piece unit from a relatively rigid, moldable synthetic plastic material, such as the thermoplastic material "Lexan" marketed by General Electric, having sufficient flexibility to permit flexing of the locking flange 50 but still having sufficient structural integrity to hold the switch assembly 10 on the panel 42. The bushing 12 can be constructed from the same type of plastic material and the recess 36 formed therein during molding. With this arrangement, the snap-in member 44 is simply slipped over the outer end of the bushing 12 and fitted into the bushing recess 36. When a separate snap-in member 44 is used in accordance with a preferred embodiment, it can be bonded to the bushing 12 for retention thereon, such as with a suitable adhesive or welded thereto by a conventional plastic welding technique when both are constructed from a synthetic thermoplastic material. In this case, the legs 48 can be omitted because the ring-like portion 46 of the snap-in member 44 can be adequately retained on the bushing 12 without the need of the additional retention normally provided by the legs.

It is within the scope of the invention to form the bushing 12 from the same general type of synthetic plastic material described above and to form the locking flange 50 and the ridge 54 as integral parts thereof instead of providing a separate snap-in member.

For mounting of the switch assembly 10, the outer end of the bushing 12 is inserted through the panel mounting hole 40 from the back 64 of the support panel 42. As the flared locking flange 50 is moved through the hole, an intermediate portion of the flange is engaged by the inner wall of the hole, thereby providing a camming action for radially compressing the locking flange 50 so as to permit it to be squeezed through the hole as shown in FIG. 6. Once the inner edge 52 of the locking flange 50 has been moved past the front rim of the hole 44, the resilient character of the flange causes it to expand or "snap back" to its normally flared position where the inner edge 52 can engage the front side 66 of the support panel 42 and the flange completely covers the mounting hole except for the slot 58 aligned with the bushing keyway 38. The bearing surface 56 on the snap-in member ridge 54 engages the back rim of the mounting hole 40 just prior to the time the locking flange inner edge 52 clears the front rim of the hole. The resilient character of the ridge 54 permits the small additional axial movement required to free the locking flange 50 and the ridge 54 thereafter cooperates with the locking flange inner edge 42 to securely hold the switch assembly 10 on the support panel 42.

While the invention has been illustrated and described in connection with a bushing having a circular cross section and a circular support panel mounting hole, it should be apparent that other shapes can be used as long as the locking flange is substantially continuous around the periphery of the hole. Also, the snap-in mounting means can be used with devices other than electrical devices and with electrical devices having actuators other than toggle levers.

While preferred embodiments of the invention have been illustrated and described in detail, it will be apparent to those skilled in the art that various changes and modifications can be made thereto to adapt the invention to various uses without departing from the scope of the invention as defined in the appended claims.

I claim:

1. A snap-in mounting means for a device adapting the device to be mounted from the back of and through a hole in a support panel to secure the device on the panel so that part of the device is accessible from the front of the panel comprising an elongated bushing carrying the accessible part of the device, said bushing including an outer end portion adapted to be inserted through the panel mounting hole and locking recess in the outer surface thereof, and a snap-in member having a complementary locking portion and snapping snugly into said bushing recess, and snap-in member including a resilient locking flange which flares radially outwardly and downwardly from the outer end of said bushing towards the device and terminates in an inner edge, said locking flange having a cross section intermediate its ends approximating, but less than, the dimension of the panel mounting hole and being radially compressible and expandable with respect to said bushing, said snap-in member further including a radially extending, generally annular ridge having a bearing surface which is axially spaced from said locking flange inner edge at a distance approximating the thickness of the panel and is adapted to engage the back side rim of the panel mounting hole, whereby, as said bushing and said snap-in member are pressed into the panel mounting hole for mounting the device, said locking flange is compressed radially inwardly to permit passage thereof through the panel mounting hole and thereafter expands to its normally flared position where said inner edge engages the front side of the panel and cooperates with said ridge bearing surface to hold the device on the panel.

2. A snap-in mounting means according to claim 1 wherein said ridge bearing surface is tapered in cross section downwardly toward the device.

3. A snap-in mounting means according to claim 1 wherein said snap-in member has a ring-like portion including said locking flange and said ridge and a pair of opposed legs depending from said ring-like portion, and said bushing recess includes portions for receiving said ring-like portion and said legs, said legs snuggly hugging the bottom walls of the leg-receiving portions of said bushing recess.

4. A snap-in mounting means according to claim 3 wherein each of said snap-in member legs has a lateral extension, and said bushing recess includes portions receiving said leg extensions so as to retain said snap-in ring member against axial movement relative to said bushing.

5. A snap-in mounting means according to claim 4 wherein each of said legs has a generally inverted T-shape, and sad leg-receiving portions of said bushing recess have a shape corresponding to the shape of said legs.

6. A snap-in mounting means according to claim 5 wherein said snap-in member is formed from a moldable synthetic plastic material.

7. In a toggle switch adapted to be snap-in mounted from the back of the panel through a hole in the panel and including an insulating base housing switch contact, a switch frame covering the base, and a pivotal toggle lever for actuating the switch contacts, wherein the improvement comprises an elongated hollow bushing mounted on and extending outwardly from said switch frame and pivotally supporting said toggle lever, said bushing having an outer end portion adapted to be inserted through the panel mounting hole, a one-piece snap-in member carried in a recess in the outer surface of said bushing and including a ring-like portion located at the outer end portion of said bushing and having a resilient locking flange which flares from the outer end of said ring-like portion radially outwardly and downwardly towards said switch base and terminates at an inner edge, said locking flange having a cross section intermediate its ends approximating, but less than, the dimension of the panel mounting hole and being radially compressible and expandable with respect to said bushing, a radially extending, annular ridge on said ring-like portion having a bearing surface which is axially spaced from said locking flange inner edge at a distance approximating the thickness of the panel and is adapted to abut the backside rim of the panel mounting hole, and a pair of opposed legs which depend from said ring-like portion, which are received in portions of said bushing recess, and which are adapted to hug the bottom walls of the leg-receiving portions of said bushing recess, whereby, as said bushing is pressed into the panel mounting hole for mounting said switch, said locking flange is compressed radially inwardly to permit passage thereof through the panel mounting hole and thereafter expands to its normally flared position where said inner edge engages the front side of the panel and cooperates with said ridge bearing surface engaging the backside rim of the panel mounting hole to hold said switch to the panel.

8. A toggle switch according to claim 7 wherein said ridge bearing surface is tapered in cross section downwardly towards said switch.

9. A toggle switch according to claim 8 wherein said legs have a generally inverted T-shape, and said leg-receiving portions of said bushing recess have a shape corresponding to the shape of said legs.

10. A toggle switch according to claim 9 wherein said snap-in member is formed from a moldable synthetic plastic material.

* * * * *